Figure 1:
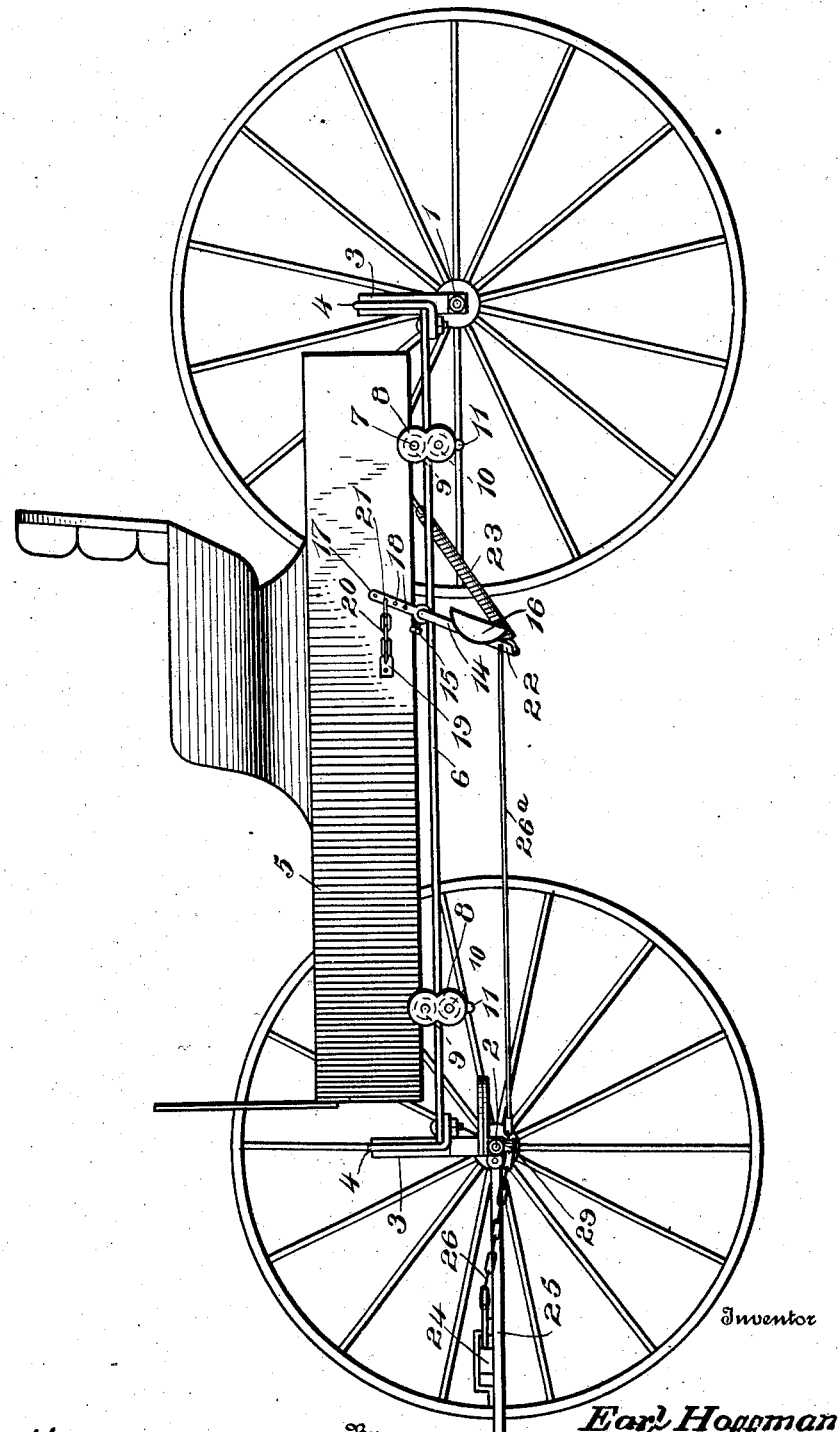

No. 850,225. PATENTED APR. 16, 1907.
E. HOFFMAN.
VEHICLE BRAKE.
APPLICATION FILED APR. 6, 1906.

2 SHEETS—SHEET 1.

Witnesses
T. P. Britt
K. G. Whitcomb

Inventor
Earl Hoffman
By Swift & Co. Attorneys

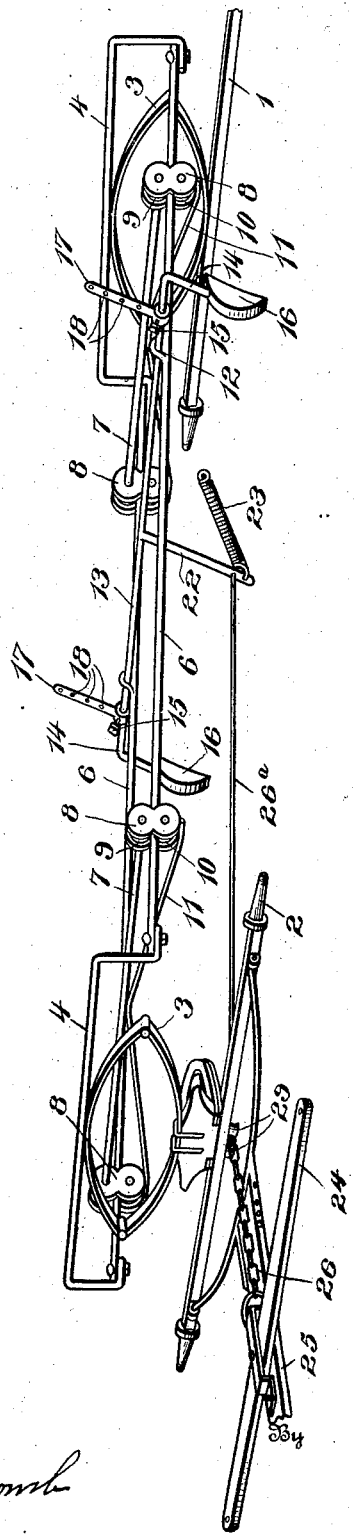

UNITED STATES PATENT OFFICE.

EARL HOFFMAN, OF COMSTOCK, NEBRASKA.

VEHICLE-BRAKE.

No. 850,225.　　　　Specification of Letters Patent.　　　Patented April 16, 1907.

Application filed April 6, 1906. Serial No. 310,310.

*To all whom it may concern:*

Be it known that I, EARL HOFFMAN, a citizen of the United States, residing at Comstock, in the county of Custer and State of Nebraska, have invented certain new and useful Improvements in Vehicle-Brakes, of which the following is a specification, reference being had therein to the accompanying drawings.

This invention relates to vehicle-brakes, and has for an object to provide a brake which is operated automatically by the load of the vehicle when going down hills.

Another object is to provide a movable vehicle-body acting to throw on the brakes when going down a hill, the brakes being withdrawn by the draft animal or animals.

Other and further objects will appear in the following description and will be more particularly pointed out in the appended claim.

In the drawings, Figure 1 is a side elevation of the vehicle employing my brake. Fig. 2 is a perspective view of the same vehicle with the body and wheels removed. Fig. 3 is a perspective view of one embodiment of the whiffletree-mounting. Fig. 4 is a sectional view of another embodiment of the whiffletree-mounting.

Referring more particularly to the drawings, 1 indicates the rear axle; 2, the front axle; 3, the vehicle-springs supporting the regular body-loops 4, and 5 the vehicle-body.

The body-loops 4 are connected on each side of the carriage by tracks 6 in the form of pipes, and the vehicle-body 5 is adapted to travel on the tracks 6 in the direction of the draft of the vehicle and relatively to the vehicle-axles. To permit the free travel of the body 5 on the tracks, the body has secured near each end a cross-piece 7, each cross-piece having secured at each end a bearing-frame 8, which is located on the outside of its track and carries an upper roller 9 and a lower roller 10. The rollers 9 and 10 are adapted to run, respectively, upon the upper face and lower face of the tracks. The bearing-frames 8 of each cross-piece are connected to each other below the tracks by a brace 11, which is connected near its center to its cross-piece 7.

Extending transversely of the vehicle and journaled at 12 on the tracks 6 is a brake rock-shaft 13, having at each end a hanger 14, which is adjustable on the shaft by a set-screw 15 and carries a brake-shoe 16 to engage the rear wheels, and an upwardly-extending arm 17, provided with a plurality of openings 18.

The body 5 is flexibly connected to each of the arms 17, so that when the vehicle-body moves forward relatively to the axles the levers will cause the rocking of the shaft 13 and the application of brake-shoes 16.

Each flexible connection comprises a hook 19, screwed to the body, and a chain 20, secured to the hook and in any one of the openings 18 by another hook 21. The series of openings 18 is provided so that the pressure on the shoes 16 may be varied to agree with the load in the vehicle. For a very light load the leverage would be the maximum, and for a very heavy load the leverage would be the minimum.

Depending from the center of the rock-shaft 13 and beneath the body is an arm 22, to the free end of which is connected one end of a coil-spring 23, which extends rearwardly and upwardly therefrom and is connected to the bottom of the vehicle-body, thereby tending to hold the brake-shoes to the tires of the wheels.

As before stated, the vehicle has its brakes applied automatically when going down a hill. To remove the brakes when the bottom of the hill is reached and maintain them removed from the tires, I provide a mechanism connected to the whiffletree of the vehicle, so as to be operated by the draft animal or animals when they are pulling thereon. For this purpose the whiffletree 24 is slidably mounted on the thill 25 and has a flexible connection 26 with a pull-bar 26ª, which is also connected to the arm 22 on the rock-shaft 13, whereby when the animals pull on the whiffletree the shaft 13 is rocked in a direction to pull off the brake-shoes and return the body 5 to its original position.

The details of construction herein shown may be varied in many ways. For instance, instead of having the whiffletree slidable on the thills it may be connected to one end of a lever 27, pivoted intermediate its ends at 28 on the thills and connected at its other end to the flexible connection 26.

The flexible connection 26 passes between guide-pulley 29.

It is apparent that as soon as the animals stop pulling on the whiffletree the coil-spring 23 will apply the brakes. If the vehicle is going down a hill, the body 5 will then move on the tracks 6, and the weight of the body and its load will assist in the braking action.

Having thus described my invention, what I claim, and desire to secure by Letters Patent, is—

A vehicle-brake, comprising a frame, having guide-rods on each side of said vehicle, bearings mounted on the front and rear of said rods, transverse rods connecting the bearings and forming supports for the vehicle-body, said rods having a pair of front and rear L-shaped projections to limit the movement of said vehicle-body, a rock-shaft having brake-shoes thereon, and a pair of vertically-disposed arms, adapted to apply said brakes, when the vehicle is traveling downgrade.

In testimony whereof I hereunto affix my signature in presence of two witnesses.

EARL HOFFMAN.

Witnesses:
H. B. GLOVER,
JOSEPH ALLANEEK.